May 4, 1926.
W. B. DALE
LAUNDRY TUB COCK
Filed Jan. 21, 1924
1,583,128
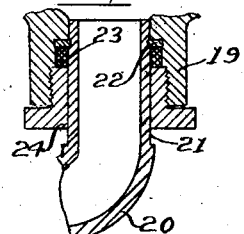
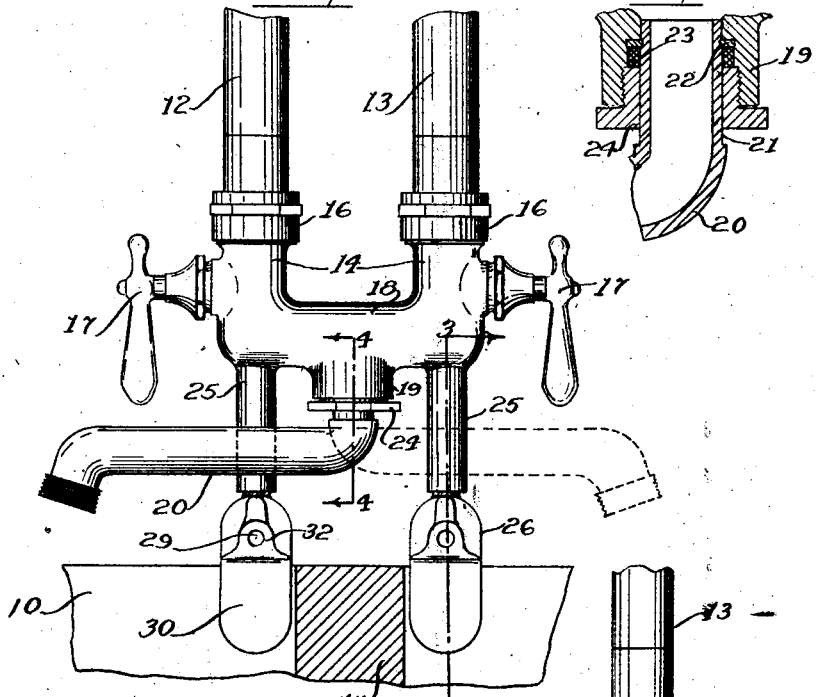
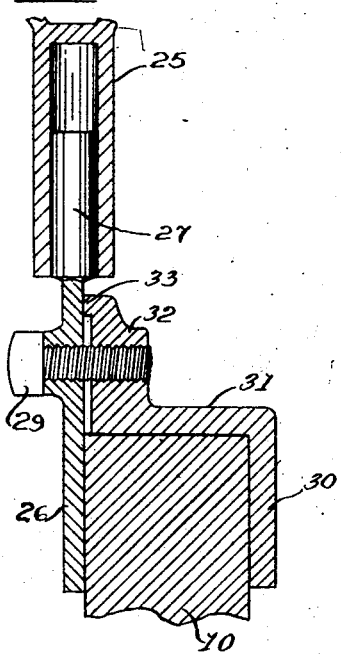
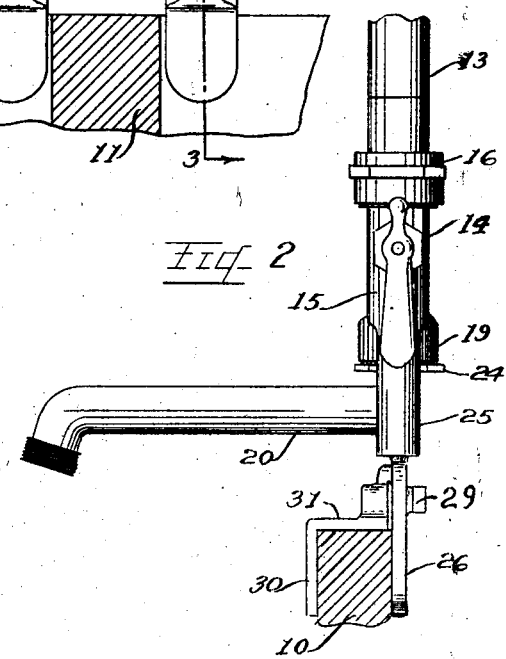
Inventor
William Bird Dale.
by Charles W. Hill
Attys.

Patented May 4, 1926.

1,583,128

UNITED STATES PATENT OFFICE.

WILLIAM BIRD DALE, OF WINNETKA, ILLINOIS, ASSIGNOR TO STREET & KENT MFG. CO., OF CHICAGO, ILLINOIS, A CORPORATION OF ILLINOIS.

LAUNDRY-TUB COCK.

Application filed January 21, 1924. Serial No. 687,480.

*To all whom it may concern:*

Be it known that I, WILLIAM BIRD DALE, a citizen of the United States, and a resident of the city of Winnetka, in the county of Cook and State of Illinois, have invented certain new and useful Improvements in Laundry-Tub Cocks; and I hereby declare that the following is a full, clear, and exact description of the same, reference being had to the accompanying drawings, and to the numerals of reference marked thereon, which form a part of this specification.

This invention relates to laundry tub cocks or faucets for double compartment tubs wherein the faucets have a common swinging discharge spout or nozzle adapted to supply hot, temperate or cold water at will to either compartment of the tub.

It is an object of this invention to provide an improved form of clamp to attach the device to the rim of a laundry tub.

It is also an object of this invention to provide an improved form of swivel spout wherein the spout will be freely movable without the liability of leakage at the swivel joint or unloosening of the packing nut due to rotation of the spout.

Other and further important objects of this invention will be apparent from the disclosures in the specification and the accompanying drawings.

This invention (in a preferred form) is illustrated in the drawings and hereinafter more fully described.

On the drawings:

Figure 1 is a front elevation of a device embodying the features of this invention shown attached to a fragmentary portion of a laundry tub.

Figure 2 is a side elevation thereof.

Figure 3 is a slightly enlarged section on the line 3—3 of Figure 1.

Figure 4 is a fragmentary enlarged section on the line 4—4 of Figure 1.

As shown on the drawings:—

The reference numeral 10 is applied to a side wall of an ordinary laundry tub, the partition being indicated at 11. Numerals 12 and 13 refer to hot and cold water supply pipes which are connected to the upstanding legs 14 of H shaped body 15 by union 16. Each upstanding leg 14 contains a faucet or valve 17 controlling the flow of water to the cross member 18 from the center of which a dependent boss 19 is formed to support a laterally movable spout 20, the stem 21 of which carries a collar 22 fitting into a rocess in the boss 19 and held therein by packing 23 and a gland or packing nut 24.

Depending legs 25 in the form of sockets are provided to receive clamping members to engage the rim of the tub. These clamping members comprise rear sections, having prongs or pads 26 to engage the outside surface of the tub wall, together with straight upstanding shanks 27 which enter the sockets 25 and are free to move therein. Between the pad and shank an aperture is provided for a cap screw 29 to secure the complementary members of the clamp which comprise offset pads 30 to grip the inside of the tub wall, horizontal portions 31 to rest on the top of the wall, a vertical portion 32 apertured for the cap screw, and an outstanding lug 33 at the top to engage the surface of the rear section whereby tightening the capscrew cocks the entire complementary member to cause the pads of both members to securely grip the rim of the tub.

A very important feature of this structure is the freedom of movement allowed the faucet structure relative to the clamping members, which securely hold the fixture in its proper position without restraining it from vertical expansion and contraction movements due to the long lengths of pipe leading thereto which are subjected to widely varying temperature conditions which would strain the fastenings if such a fixture were immovably secured to the rim of the tub. This structure has the further advantage that the ease of installation is greatly increased as the clamps may be loosely assembled on the rim of the tub and the fixture simply placed thereon and connected to the water supply piping. Inasmuch as the clamps are freely movable with respect to the fixture and are entirely separate one from the other, they are adaptable for the widely varying conditions encountered, such as wood or composition tubs of varying thicknesses of rim.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A faucet structure including integral hot and cold water supply valves, a swivel spout associated with said structure, dependent sockets, tub engaging clamps, and shanks thereon movable within said sockets to permit movement of the structure due to expansion and contraction of the water supply piping.

2. In combination with a faucet body having hot and cold water connections and valves therefor, clamping means for attaching said body to the rim of a tub, comprising individual clamps having a self adjusting engagement with the body whereby expansion strains of the body are not transmitted to the clamps.

3. In combination with a faucet body having a water supply inlet and outlet, and a control valve therefor, clamping means for attaching said body to a tub, said clamping means being adapted to allow relative movement between said body and said tub.

In testimony whereof I have hereunto subscribed my name.

WILLIAM BIRD DALE.